G. ANDERSON & H. P. HOFSTRAND.
GATHERING AND LOADING MACHINE.
APPLICATION FILED MAR. 2, 1916.
1,217,131.
Patented Feb. 27, 1917.
4 SHEETS—SHEET 2.
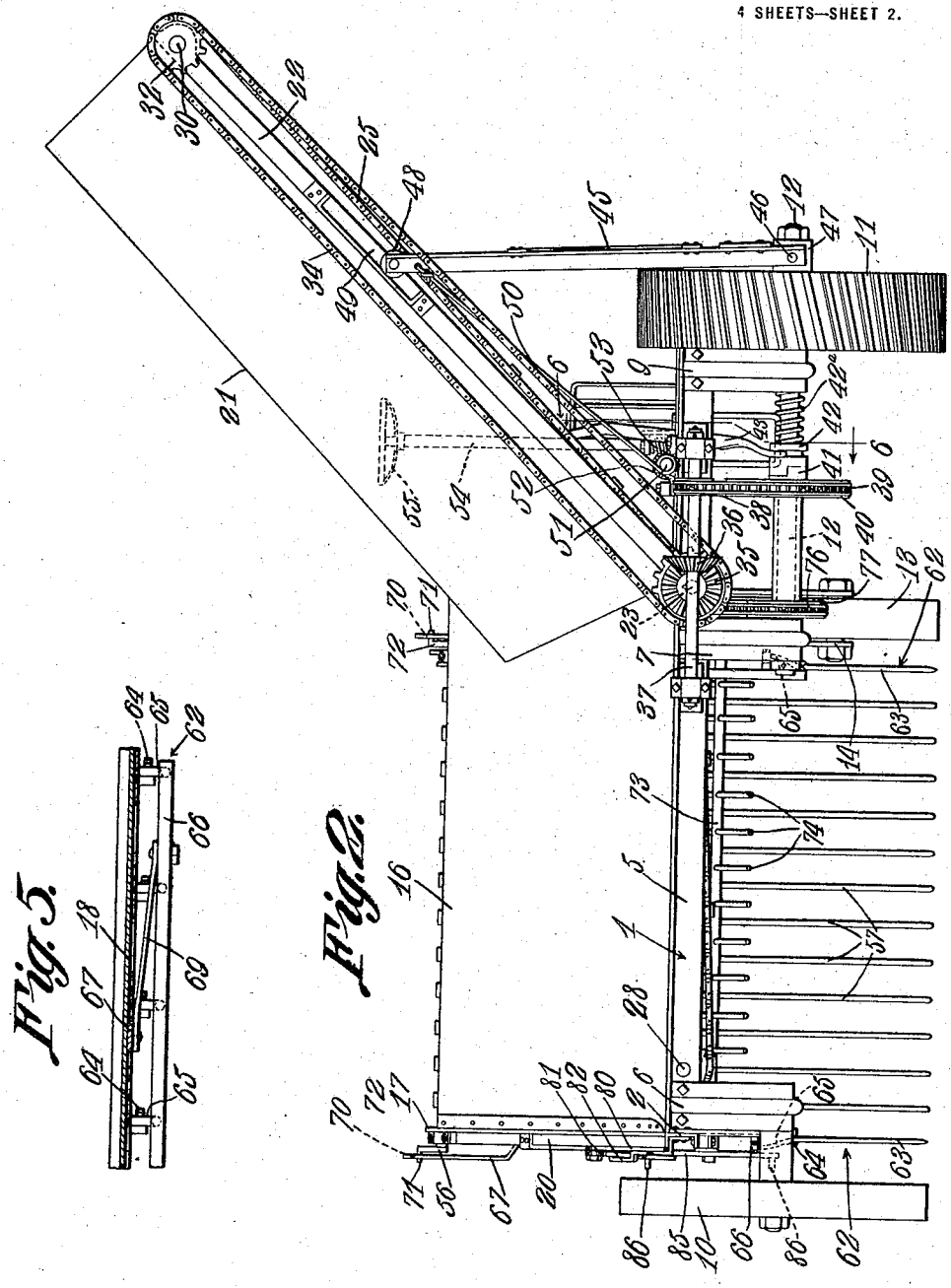
Witnesses
G. Anderson and H. P. Hofstrand, Inventors
by C. A. Snow & Co., Attorneys G. ANDERSON & H. P. HOFSTRAND.
GATHERING AND LOADING MACHINE.
APPLICATION FILED MAR. 2, 1916.
1,217,131.
Patented Feb. 27, 1917.
4 SHEETS—SHEET 3.
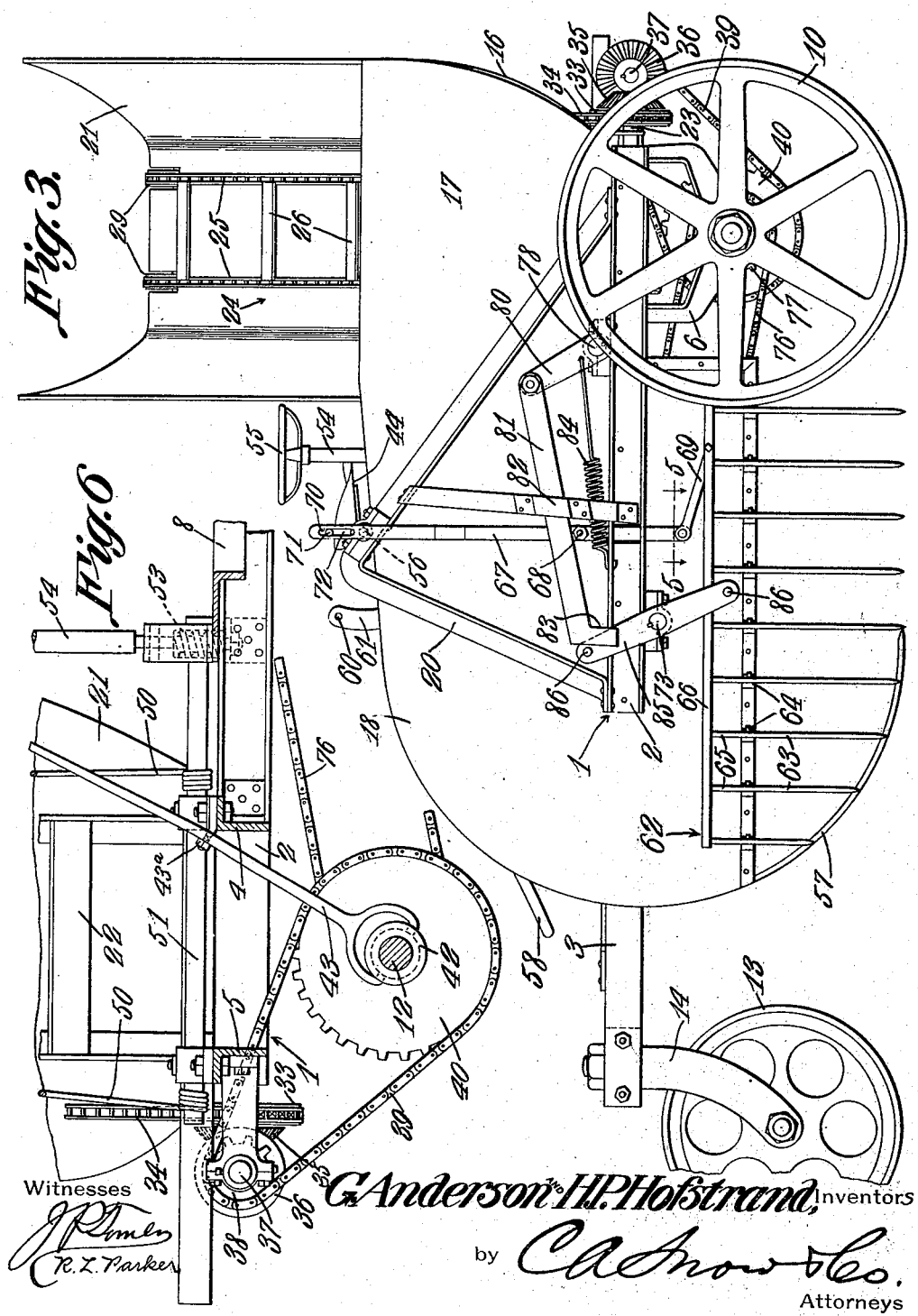

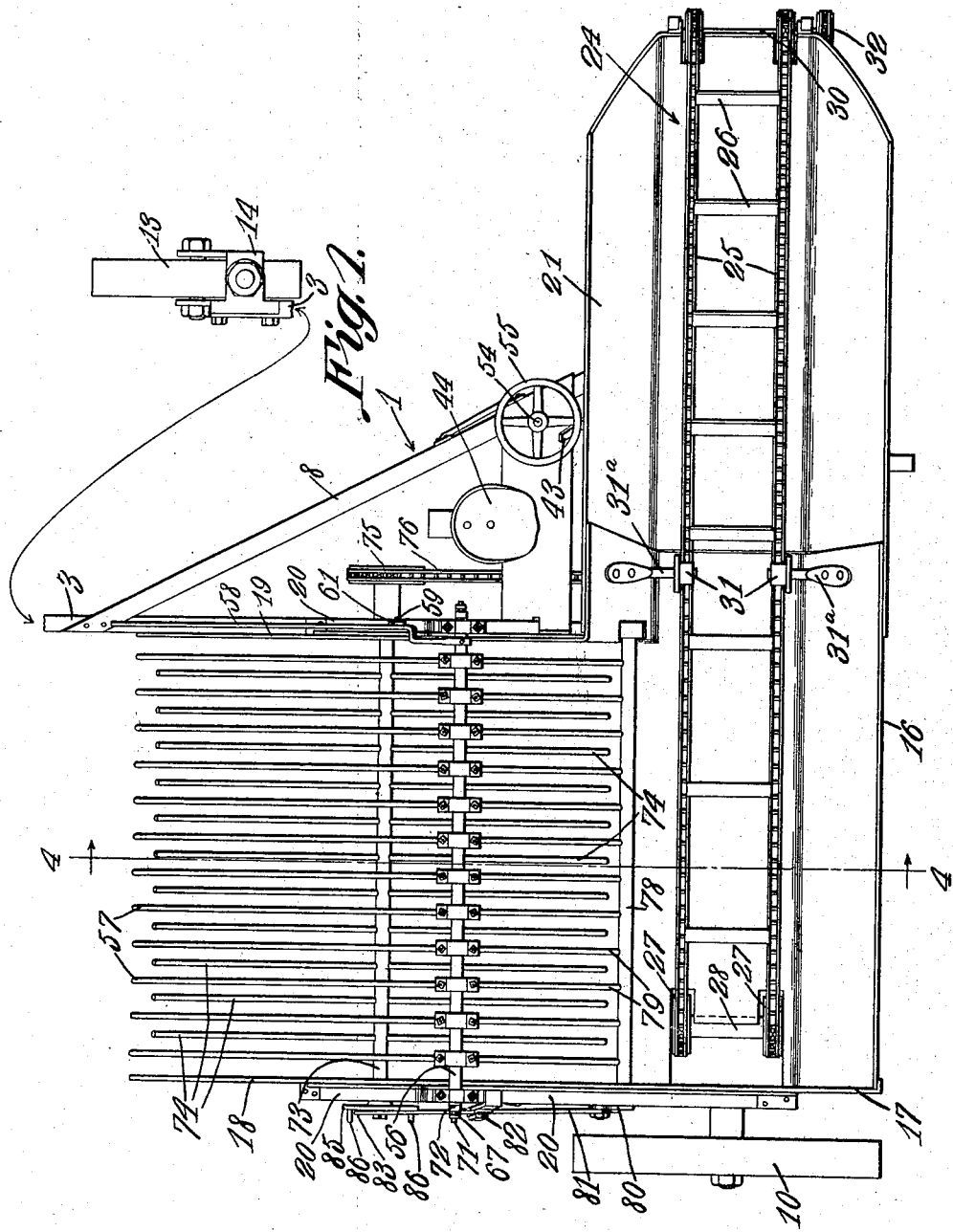

G. ANDERSON & H. P. HOFSTRAND.
GATHERING AND LOADING MACHINE.
APPLICATION FILED MAR. 2, 1916.
1,217,131. Patented Feb. 27, 1917.
4 SHEETS—SHEET 4.
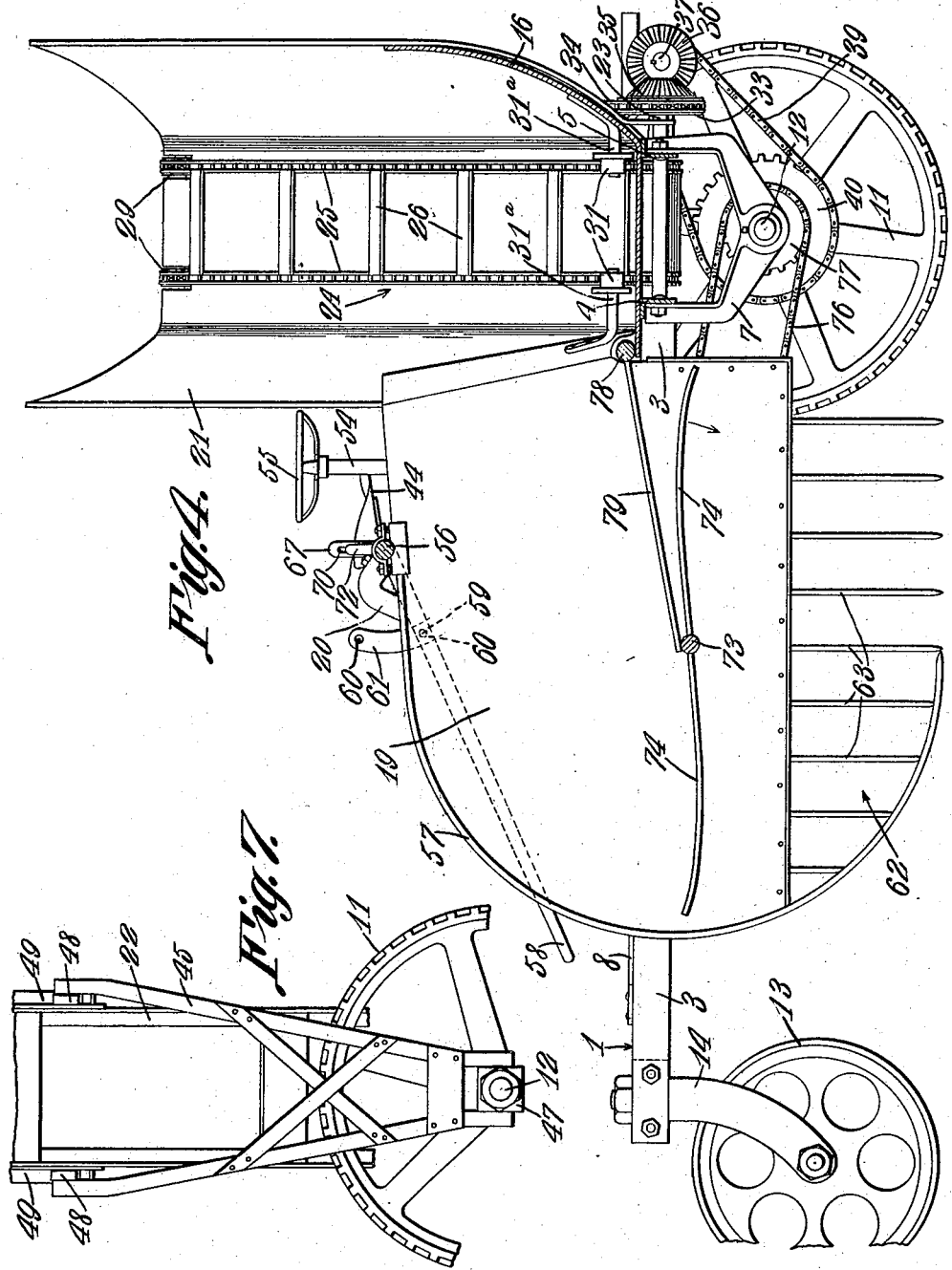
Witnesses
J. R. Towle
R. L. Parker.
G. Anderson and H. P. Hofstrand, Inventors
by C. A. Snow & Co.
Attorneys

UNITED STATES PATENT OFFICE.

GUSTAV ANDERSON AND HENRY P. HOFSTRAND, OF ST. LOUIS PARK, MINNESOTA.

GATHERING AND LOADING MACHINE.

1,217,131.   Specification of Letters Patent.   Patented Feb. 27, 1917.

Application filed March 2, 1916. Serial No. 81,720.

*To all whom it may concern:*

Be it known that we, GUSTAV ANDERSON and HENRY P. HOFSTRAND, subject of the King of Sweden and citizen of the United States, respectively, residing at St. Louis Park, in the county of Hennepin, State of Minnesota, have invented a new and useful Gathering and Loading Machine of which the following is a specification.

The present invention appertains to gathering and loading machines, and aims to provide a novel and improved machine for gathering hay, clover, shocks or bundles of wheat or oats, or other material, and for elevating the same so that it can be loaded into a wagon, the device being adapted to be run over the field with a wagon at one side thereof to catch the material delivered therefrom.

The invention includes a gathering and loading machine having novel and improved features of construction, to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the machine, a portion thereof being broken away and set to one side, in order that the view can be of the largest possible scale.

Fig. 2 is a front view of the machine.

Fig. 3 is a side elevation thereof, a portion of the caster wheel being broken away.

Fig. 4 is a longitudinal section of the machine taken on the line 4—4 of Fig. 1.

Fig. 5 is an enlarged sectional detail taken on the line 5—5 of Fig. 3.

Fig. 6 is an enlarged sectional view taken on the line 6—6 of Fig. 2.

Fig. 7 is an enlarged elevation illustrating the prop for supporting the elevator frame.

In carrying out the invention, there is provided a main frame 1 of any suitable construction, and constructed of channel iron, angle iron, or other suitable material. This frame embodies a pair of spaced parallel longitudinal beams 2 and 3, the beam 3 being longer than the beam 2, and the frame also includes transverse or cross pieces 4 and 5 secured to the forward end portions of the beams 2 and 3, and projecting to one side beyond the beam 3. The beam 2 is at the right hand side of the machine looking forwardly, while the beam 3 is at the left hand side, and the cross piece 5 is in front of the cross piece 4. Secured to the cross pieces 4 and 5 are U-shaped brackets 6 and 7 located adjacent the respective beams 2 and 3, and an oblique brace 8 connects the rear terminal of the beam 3 and the left hand terminals of the cross pieces 4 and 5. A third U-shaped bracket 9 is attached to the left hand terminals of the cross pieces. The brackets 6, 7 and 9 project downwardly from the cross pieces and are in transverse alinement.

The frame is wheel mounted, whereby it can be readily drawn over the field. A ground wheel 10 is journaled to the intermediate portion of the right hand bracket 6, and a drive wheel 11 is keyed upon a shaft or axle 12 journaled through the intermediate portions of the brackets 9 and 7 transversely of the frame. A rear caster wheel 13 is journaled within a caster fork 14 whose shank is journaled to the rear end of the beam 3. The caster wheel 13 coöperates with the front wheels 10 and 11 for providing a three point support for the frame. The machine may be drawn over the ground by means of draft animals hitched thereto or a tractor may be employed for pulling the machine.

A transverse horizontal conveyer chute 16 constructed of sheet metal or other suitable material is mounted upon the cross pieces 4 and 5 and upon the forward terminals of the beams 2 and 3, and the left hand end of the chute 16 is open, while the right hand end is closed by the end wall 17. This end wall 17 is extended rearwardly to form the wing 18 secured to the rear portion of the machine. A wing 19 is attached to the rear wall of the chute 16 parallel with the wing 18, and is secured to the beam 3. The lower edges of the wings 18 and 19 project below the beams, and the rear wall of chute 16 is open between the wings. Inverted V-shaped brackets 20 are terminally secured upon the beams 2 and 3 at the remote or outer sides of the wings 18 and 19, and said wings are attached to said brackets for reinforcing or strengthening the wings.

An inclined elevator chute 21 has its lower end fitting under the left hand end of the conveyer chute 16, and the bottom of the chute 21 is secured upon an elevator frame 22 which has its lower end pivotally engaging a longitudinal shaft 23 journaled to the cross pieces 4 and 5 adjacent the beam 3 and open end of the chute 16. The frame 22 may therefore be swung vertically about a horizontal axis for changing the inclination of the elevator chute 21, the lower end of said chute slidably fitting the open end of the conveyer chute 16.

Mounted for movement within the chutes 16 and 21, is an endless conveyer belt 24, embodying a pair of endless sprocket chains 25 and cross slats 26 terminally secured to the chains 25. The upper run of the belt 24 passes over the bottoms of the chutes 16 and 21, while the lower run of said belt passes under the bottoms of said chutes. The sprocket chains 25 are passed around sprocket wheels 27 mounted upon a short longitudinal shaft 28 journaled to the cross pieces 4 and 5 at the closed or right hand end of the chute 16, and the chains 25 are also passed over sprocket wheels 29 keyed upon a short horizontal shaft 30 journaled to the upper or free end of the elevator frame 22. The upper runs of the chains 25 are passed under rollers or rotary guides 31 disposed at the junction between the chutes 16 and 21, and carried by suitable brackets 31ª attached to the sides of the chute 16 adjacent the open end thereof. The rollers 31 hold the upper run of the belt down at the adjacent or meeting ends of the chutes, whereby the upper run of the belt will move snugly upon the bottoms of both chutes. The upper run of the belt moves horizontally from the right to the left over the bottom of the conveyer chute 16, and moves upwardly in the same direction over the bottom of the elevator chute 21, for carrying the material from the chute 16 through the chute 21.

In order to actuate the conveyer belt 24, a sprocket wheel 32 is keyed upon the forward end of the shaft 30, and a sprocket wheel 33 is keyed upon the forward end of the shaft 23, an endless sprocket chain 34 being trained around said sprocket wheels, whereby when the shaft 23 is rotated, the shaft 30 will be rotated for actuating the belt. A bevel gear 35 is keyed upon the forward end of the shaft 23 and meshes with a bevel gear 36 keyed upon a transverse shaft 37 journaled to the cross piece 5 in front of the same. A sprocket wheel 38 is keyed upon the shaft 37 and an endless sprocket chain 39 is passed around said sprocket wheel 38 and around a sprocket wheel 40 mounted loosely upon the shaft 12 of the drive wheel 11. This sprocket wheel 40 has a clutch hub 41 coöperating with a clutch member 42 feathered upon the shaft 12, and normally moved into engagement with the clutch hub 41 under the influence of a spring 42ª between the clutch member 42 and bracket 9. A hand lever 43, fulcrumed to the frame as at 43ª, has one arm engaged with the clutch member 42 and the other arm of the lever 43 projects close adjacent the operator's seat 44 carried by the frame in the angle between the wing 19 and the conveyer chute 21. Since the clutch member 42 normally engages the clutch hub 41, the sprocket wheel 40 will be rotated with the shaft 12 of the drive wheel 11, and this will rotate the shaft 37 and consequently the shaft 23, to operate the conveyer belt. The operation of the conveyer belt can be stopped by swinging the lever 43 to disengage the clutch member 42 from the clutch hub 41 of the sprocket wheel 40, as will be apparent.

In order to adjustably support the elevator frame 22, whereby the elevator chute 21 can be supported at various angles, a prop 45 has its lower end pivoted, as at 46, to a block 47 mounted loosely upon the outer end of the shaft 12, and a pair of rollers or wheels 48 are carried by the upper end of the prop 45 and work within inclined guides 49 carried by the sides of the inclined frame 22, so that when the prop 45 is swung, the rollers 48 in traveling within the guides 49, will result in the swinging movement of the frame 22. This prop 45 is adjusted by means of cables or flexible elements 50 attached thereto and wound upon a longitudinal winding shaft 51 journaled upon the cross pieces 4 and 5 underneath the chute 21. A worm wheel 52 is keyed upon the rear end of the winding shaft 51 and meshes with a worm 53 secured upon the lower end of a vertical shaft 54 journaled to the frame in any suitable manner. The upper end of the shaft 54 has a hand wheel 55 adjacent the operator's seat 44, whereby the hand wheel 55 can be rotated to rotate the winding shaft 51 for winding up the cables 50 or permitting said cables to unwind. When the cables 50 are wound upon the shaft 51, the prop 45 is swung inwardly, which will raise the frame 22 and chute 21 carried thereby, and when the cables are unwound, the prop 45 can swing outwardly under the weight of the frame 22 and chute 21, to allow said frame and chute to swing downwardly. It is thus possible for the operator to properly adjust the elevator chute, so that the wagon or other receptacle below the upper or delivery end of the chute 21 will properly receive the material delivered from the chute 21.

Mounted between the wings 18—19 in rear of the conveyer chute 16, is a gathering rake embodying a transverse rock shaft 56 terminally journaled to the upper portions of the brackets 20, and having attached thereto the upper ends of curved resilient or spring teeth 57. The teeth 57 are curved rearwardly from the shaft 56, thence downwardly, and thence forwardly, so that their lower ends project forwardly to catch the hay or other material, whereby the material is gathered within the rake teeth 57 between the wings 18—19.

This gathering rake can be swung upwardly out of the way when desired, through the medium of a hand lever 58 secured to the left hand end of the rock shaft 56, and provided with a stud or pin 59 engageable in one of a pair of apertures 60 with which a holding strip 61 is provided, said holding strip being secured to the bracket 20 at the left side of the machine. When the rake is swung downwardly, the stud 59 snaps into the lower aperture 60, for holding the rake in place, and said stud may be readily sprung out of said aperture, to enable the rake to be swung upwardly by raising the lever 58. When the lever is raised to swing the rake out of the way, the stud 59 will snap into the upper aperture 60 for holding the rake raised. The rake can be lowered at any time by releasing the lever to allow the rake to swing downwardly.

Carried by the lower edges of the wings 18—19 is a pair of side guards 62, each of which comprises a longitudinal series of depending fingers or teeth 63, preferably formed from rods. The said fingers 63, are pivoted, as at 64, to the lower edge of the respective wing, and the fingers have outwardly bent portions 65 above the pivots. A longitudinal bar 66 is attached to the portions 65, and a vertical lever 67 is fulcrumed or pivoted to each wing, as at 68. The lower end of each lever 67 is connected by an oblique link 69 with the respective bar 66. The upper terminal of each lever 67 has a longitudinal slot 70 receiving the pin 71 of an upwardly projecting arm 72 secured to the respective end of the rock shaft 56. Ordinarily, when the gathering rake is lowered, the guards 62 are in depending positions, to confine the hay or material within the gathering rake. When the rake is raised, the arms 72 are swung forwardly, and this swings the lower arms of the levers 67 rearwardly. As a result, the links 69 are drawn rearwardly, which pulls the bars 66 toward the wings 18—19, resulting in the fingers 63 being swung outwardly and upwardly slightly, out of the way. The guards are thus swung out of the way at the same time that the rake is swung upwardly, and when the rake is returned to active position, the guards are swung downwardly to proper position.

In order to elevate the hay or other material which is gathered by the fork, there is provided a rotary elevator embodying a transverse shaft 73 journaled to the beams 2—3 between the gathering rake and chute 16, and two sets of oppositely projecting spring arms 74 are attached to the shaft 73 between the wings 18—19. The free ends of the arms 74 are adapted to work between the lower terminals of the rake teeth 57, so that the arms 74 properly catch the hay or material and carry the same upward along the rake teeth.

The rotary elevator is rotated in the proper direction (clockwise as viewed in Fig. 4), and to this end a sprocket wheel 75 is keyed upon the left hand end of the shaft 73, and an endless sprocket chain 76 is passed around said sprocket wheel and around a sprocket wheel 77 mounted upon the shaft 12 and attached to the sprocket wheel 40, whereby when the sprocket wheel 40 is rotated, the rotary elevator will be rotated also.

A stripper is employed for stripping the hay or material from the arms 74 of the rotary elevator, and for forcing the material into the conveyer chute 16, and this stripper embodies a transverse rock shaft 78 journaled to the frame adjacent the rear cross piece 4. The stripper has a series of arms 79 attached to the shaft 78. These arms 79 are swung from a rearwardly projecting position, as seen in Fig. 4, to an upwardly projecting position within the rear opening of the chute 16, and to this end, the rock shaft 78 is oscillated properly. To accomplish this, an upwardly projecting arm 80 is secured to the right hand end of the rock shaft 78, and a bar 81 is pivoted to the arm 80 and is slidable through a guide 82 carried by the beam 2 and respective bracket 20. The bar 81 projects rearwardly and has a depending portion 83 at its rear end. A spring 84 is connected to the arm 80, for swinging the stripper to normal position, as seen in Fig. 4, with the arms 78 projecting rearwardly to pass between the arms 74 of the rotary elevator. A tappet 85 is keyed to the right hand end of the shaft 73, and is provided with outstanding tappet pins 86 diametrically opposite one another, there being one pin 86 for each set of arms 74 of the rotary elevator. The portion 83 of the bar 81 lies in the path of the pins 86, whereby when the shaft 73 is rotated, the pins 86 contact with the portion 83 in succession, for properly operating the stripper. Thus, when one set of arms 74 is swinging upwardly and forwardly to carry the material onto the stripper arms 79, the respective pin 86 contacts with the portion 83, and forces the bar 81 forwardly, for swinging the arm 80 correspondingly. The rock shaft 78 is thus turned to swing the stripper arms 79 upwardly and forwardly between the respective arms 84, and as a consequence, the stripper arms strip the material from the respective elevator arms, and force the material into the conveyer chute 16 onto the conveyer belt. As soon as the material is stripped from the respective elevator fingers, and the material forced into the conveyer chute, the respective pin 86 liberates the bar 81, so that the stripper is returned to normal position under the influence of the spring 84.

The operation of the machine will no doubt be understood from the foregoing, but briefly stated is as follows:

When the machine is run over the field, the hay or other material is caught by the rake teeth 57, and the elevator arms 74 will carry the material upwardly intermittently in bunches, the stripper operating at the proper moments to strip the material from the elevator arms and deliver the material into the conveyer chute 16. The material is then taken up by the conveyer belt and carried from the chute 16 upwardly through the chute 21, so that the material is delivered from the upper end of the chute 21 into the wagon or other receptacle below the upper end of the chute 21. The operation is continuous, the wagon being moved along the field with the machine, and as soon as one wagon is filled, another can be moved below the chute 21 to receive the material. The present machine provides means for gathering and loading the hay or other material with ease and despatch.

Having thus described the invention, what is claimed as new is:

1. In a machine of the character described, a rotary elevator having a shaft and a set of arms, a stripper having arms movable between the aforesaid arms to strip the material therefrom which is raised by the elevator, means for rotating the elevator, and means for oscillating the stripper so that its arms are swung to and from said shaft.

2. In a machine of the character described, a conveyer device, a rotary elevator having a shaft and a set of arms, and an oscillatory stripper having a set of arms to work between the aforesaid arms and move to and from said shaft for stripping the material from the elevator and forcing it into the conveyer device.

3. In a machine of the character described, a conveyer device, a rotary elevator having a shaft and a set of arms, an oscillatory stripper having a set of arms movable between the aforesaid arms, means for actuating the elevator and conveyer device, and means for oscillating the stripper whereby its arms move to and from said shaft to strip the material from the first mentioned arms and forces the material into the conveyer device.

4. In a machine of the character described, a gathering rake having curved teeth, a rotary elevator coöperating with the rake and having a shaft and a set of arms, and an oscillatory stripper having a set of arms movable between the aforesaid arms to and from said shaft to strip the material therefrom.

5. In a machine of the character described, a conveyer device, a gathering rake in rear thereof having curved teeth, a rotary elevator coöperating with the rake and having a shaft and a set of arms, and an oscillatory stripper having a set of arms movable between the aforesaid arms to and from said shaft for stripping the material therefrom and forcing it into the conveyer device.

6. In a machine of the character described, a rotary elevator having a shaft, an oscillatory stripper, a portion of the elevator being movable toward the stripper and the stripper normally projecting into the path of said portion near said shaft, means for rotating the elevator, and means for swinging the stripper upwardly when said portion of the elevator moves toward the stripper.

7. In a machine of the character described, a rotary elevator having a shaft and a set of arms, an oscillatory stripper having a set of arms movable between the first mentioned arms to and from said shaft, the elevator arms being movable toward the stripper, means for rotating the elevator, and means for swinging the stripper arms upwardly from said shaft when the elevator arms move toward the same.

8. In a machine of the character described, a conveyer device, a gathering rake in rear thereof having downwardly curved teeth, a rotary elevator coöperable with the rake and having a shaft and a set of arms, an oscillatory stripper adjacent said device and coöperating with the elevator, the stripper having a set of arms movable between the aforesaid arms to and from said shaft, means for rotating the elevator and actuating the conveyer device, and means for oscillating the stripper to move the stripper arms upwardly from said shaft when the elevator arms are moved toward them so that the stripper arms strip the material from the elevator arms and force it into the conveyer device.

9. In a machine of the character described, a rotary elevator having a shaft and arms, an oscillatory stripper coöperable with the elevator and having a shaft and arms movable to and from the elevator shaft, means for rotating the first mentioned shaft, and means for operatively connecting said shafts whereby when the first mentioned shaft is rotated, the second mentioned shaft is oscillated to cause the stripper to coöperate properly with the elevator.

10. In a machine of the character described, a rotary elevator having a shaft, an oscillatory stripper having a shaft, the elevator having arms movable toward the stripper and the stripper having arms movable between the aforesaid arms to and from the elevator shaft, means for rotating the first mentioned shaft, and an operative connection between the two shafts whereby when the first mentioned shaft is rotated, the second mentioned shaft is oscillated to swing the stripper arms upwardly from the elevator shaft when the elevator arms move toward the same.

11. In a machine of the character described, a rotary elevator having a shaft, an oscillatory stripper coöperable with the elevator and having a shaft, an arm carried by the second mentioned shaft, a reciprocatory bar pivoted to said arm, and a tappet carried by the first mentioned shaft and coöperable with said bar for moving the same to oscillate the stripper when the elevator is rotated.

12. In a machine of the character described, a pair of wings, a gathering rake therebetween and adapted to be swung upwardly out of the way, a pair of guards pivoted to the said wings and normally projecting downwardly to confine the material within the rake, and means for swinging the rake and guards upwardly, the guards being swingable away from one another.

13. In a machine of the character described, a pair of wings, a gathering rake therebetween and adapted to be swung upwardly out of the way, a pair of guards pivoted to the said wings and normally projecting downwardly to confine the material within the rake, and means operatively connecting the guards and rake whereby when the rake is swung upwardly, the guards are also swung likewise.

14. In a machine of the character described, a pair of wings, a gathering rake therebetween and adapted to be swung upwardly out of the way, a pair of guards pivoted to the said wings and normally projecting downwardly to confine the material within the rake, means for raising the rake, and means for swinging the guards outwardly.

15. In a machine of the character described, a pair of wings, a gathering rake therebetween and adapted to be swung upwardly out of the way, a pair of guards pivoted to the said wings and normally projecting downwardly to confine the material within the rake, and an operative connection between the rake and guards, whereby when the rake is raised, the guards are swung outwardly.

16. In a machine of the character described, a pair of wings, a gathering rake therebetween embodying an oscillatory shaft and downwardly curved teeth attached thereto, depending guards pivoted to the lower edges of the wings and having outwardly bent portions above the pivots; levers fulcrumed to the wings, oblique links connecting the lower ends of the levers and said portions of the guards, the upper ends of the levers having longitudinal slots, and arms attached to the ends of said shaft and having pins working in said slots, whereby when the rake is raised, the guards are swung outwardly.

17. In a machine of the character described, a rotary elevator, and stripping means movable to and from the center of the elevator.

18. In a machine of the character described, a rotary elevator having a shaft and radial arms, and a stripper having arms between the elevator arms and movable to and from said shaft.

19. In a machine of the character described, an elevator embodying a rotary shaft having radial arms, a stripper having arms between the aforesaid arms and movable to and from said shaft, the elevator arms being movable toward the stripper, and means for moving the stripper arms away from said shaft when the elevator arms move toward the stripper arms.

In testimony that we claim the foregoing as our own, we have hereto affixed our signatures in the presence of two witnesses.

GUSTAV ANDERSON.
HENRY P. HOFSTRAND.

Witnesses:
F. H. KRIZ,
GUSTIE OLSON.

Copies of this patent may be obtained for five cents each, by addressing the "Commissioner of Patents, Washington, D. C."